United States Patent [19]

Wilkinson et al.

[11] 4,325,345
[45] Apr. 20, 1982

[54] GASOLINE FUEL VAPORIZATION SYSTEM FOR INTERNAL COMBUSTION ENGINES

[75] Inventors: Robert S. Wilkinson, P. O. Box 61, Newfield, Me. 04095; Alan S. Lowe, Kennebunk, Me.

[73] Assignee: Robert S. Wilkinson, Newfield, Me.

[21] Appl. No.: 71,839

[22] Filed: Sep. 4, 1979

[51] Int. Cl.³ ............................................. F02M 31/00
[52] U.S. Cl. ................................. 123/557; 123/549
[58] Field of Search ............... 123/557, 549; 219/206, 219/207, 301, 271, 276; 261/142; 338/322, 263, 264, 266

[56] References Cited

U.S. PATENT DOCUMENTS

| | | | |
|---|---|---|---|
| 736,677 | 8/1903 | Bloom | 338/266 |
| 904,203 | 11/1908 | Hertzberg | 123/549 |
| 1,805,885 | 5/1931 | Rinderspacher | 219/301 |
| 2,398,686 | 4/1946 | Zander | 338/266 |
| 2,462,746 | 2/1949 | Inman | 219/301 |
| 4,177,778 | 12/1979 | Nacton | 123/549 |

*Primary Examiner*—Ronald H. Lazarus
*Attorney, Agent, or Firm*—Daniel H. Kane, Jr.

[57] ABSTRACT

A new and improved fuel vaporization and delivery system for vaporization of gasoline from the fuel line of an internal combustion engine and for delivery of fuel in the vapor state to a conventional carburetor or into an air stream at the intake manifold to afford increased exposure of the fuel in the fuel air mixture for complete combustion and utilization of fuel. The invention incorporates self regulatory features, stages and materials to match the chemical and thermodynamic properties of gasoline while maintaining a safe margin below the flash point of gasoline.

33 Claims, 14 Drawing Figures

GASOLINE FUEL VAPORIZATION SYSTEM FOR INTERNAL COMBUSTION ENGINES

FIELD OF THE INVENTION

This invention relates to a new and improved gasoline fuel vaporization system for vaporization of gasoline supplied in the fuel line of an internal combustion engine and for delivery of fuel in the vapor state to a conventional carburetor or into an airstream at the intake manifold of the engine for increased efficiency of fuel burning and fuel utilization and increased mileage per gallon for vehicles.

BACKGROUND OF THE INVENTION

The conventional carburetor for internal combustion engines fragments the liquid fuel into a mist through a venturi aperture or outlet, introducing the fuel into an air flow. The fuel air mixture is then introduced into the cylinders through the intake manifold and valves. Similarly with fuel injection, the fuel is fragmented upon injection but remains essentially in the liquid state. It has been proposed in the past to increase the efficiency of combustion of fuel in internal combustion engines by going beyond traditional fuel droplet carburetion and injection to vaporizing the fuel into individual molecules by the application of heat. Vaporization of the fuel to individual molecules would greatly increase the exposure of the fuel in the fuel air mixture for complete combustion and burning in the combustion chamber.

However none of the previous attempts to implement a gasoline fuel vaporization and delivery system have met with success. This is in part due to the complexity of gasoline as a chemical system of over 25 fractions or compounds which vaporize at different temperatures ranging from 80° F. to 390° F. and with flash point temperatures reached at approximately 1000° F. and higher. No previous devices for fuel vaporization deal successfully with the thermodynamic problem of complete vaporization of all the fractions while maintaining a safe margin below the flash point of gasoline. Nor do any of the patents or other literature on this subject known to the inventors grapple with novel conceptual framework contemplated by the present invention for matching the stages and materials of implementation with the chemical and thermodynamic characteristics of gasoline.

SUMMARY OF THE INVENTION

It is therefore an object of the present invention to provide a new and improved fuel vaporization and delivery system for vaporization of gasoline from the fuel line of an internal combustion engine and for delivery of fuel in the vapor state to a conventional carburetor or into an airstream at the intake manifold to afford increased exposure of the fuel in the fuel air mixture for complete combustion and utilization of fuel.

Another object of the invention is to provide such a system using components, configurations and materials so arranged to match the requirements for vaporization of gasoline while assuring a safe margin below the flash point of the gasoline.

Yet another object of the invention is to provide a fuel vaporization system and device which may be easily retrofitted into existing automobiles and vehicles greatly to increase efficiency of fuel utilization and mileage per gallon of fuel consumed.

In order to accomplish these results the present invention contemplates for a gasoline fuel vaporization and delivery system for internal combustion engines providing an elongate vaporization chamber comprised of a tubular length of metal covered with high temperature resistant, high thermal conductivity electrically insulating material, a heating coil of resistance wire wrapped in a helix around the electrically insulating material, and a coating of high temperature refractory material coated over the heating coil and chamber. The vaporization chamber is formed with an inlet end for receiving liquid gasoline fuel from the fuel line of an internal combustion engine and an outlet end for delivery of fuel in the vapor state to a conventional curburetor or into an airstream at the intake manifold of the internal combustion engine.

More particularly the invention contemplates providing a heating coil of resistance wire comprised of a high temperature durable alloy having a resistance per unit length and an overall length selected to generate heat at a temperature in the chamber above the vaporization temperature of the gasoline fuel fractions or constituents but below the flash point temperature of such constituents when the coil is coupled to the electrical power supply voltage associated with the internal combustion engine. A feature and advantage of this arrangement is that the resistance wire heating coil is self limiting in temperature output attained at the applicable voltage of the power supply to a level at a safe margin below the flash point of the gasoline fractions.

For the typical gasoline fueled internal combustion engine the resistance wire heating coil parameters are selected to generate heat at temperatures in the vaporization chamber above at least approximately 390° F. and no greater than approximately 800° F. and in the case of prevailing flow rates and fuel pump pressures of 3-10 p.s.i. above atmospheric pressure, a preferred range and temperature profile of 450° F. to 600° F. extending over the length of the vaporization chamber from the inlet end to the outlet end.

According to a specific embodiment of the invention adapted for use with 12 volt electrical power supplies the resistance per unit length and overall length of the heating coil wire are selected to afford overall resistance of approximately one ohm. The heating coil resistance wire is formed in a flat ribbon configuration to facilitate winding in spaced helical turns over the tubular chamber and to enhance thermal contact and heat delivery to the chamber. With a resistance in the vicinity of 0.8 ohms per foot and a length of 15 to 18 inches and preferably 16 inches we have found the heating coil to afford the preferred temperature range and temperature profile along a vaporization chamber approximately 6 inches in length with inner diameter in the range of 5/16 to ½ inch. The helical turns of the heating coil are spaced closer together at the outlet end of the vaporization chamber to achieve the preferred temperature profile, concentrating heat delivery at the outlet end for complete vaporization of any fuel still in the liquid state. By this attention to parameters and configurations the temperature achieved in the vaporization is self limiting to a maximum of 800° F. for a 12 volt system, even with the chamber empty or dry, thereby assuring a safe margin well below the flash point temperature of gasoline which is 1000° F. and greater under the conditions prevailing in the fuel system.

In this example the high temperature durable, high thermal conductivity electrically insulating material covering the tube comprises at least two coats of a porcelain-like cement whereas the outer coating over the heating coil and chamber comprises a thick layer of "potting" of a refractory cement of lower thermal conductivity for concentrating heat in the vaporization chamber.

According to another aspect the invention contemplates means to control the flow of gasoline into the chamber and a restructed delivery orifice at the inlet end to fragment the liquid fuel as it enters the chamber and thereby facilitate vaporization. Furthermore, the restricted delivery orifice is oriented to deliver fuel in a direction off axis from the elongate axis of the vaporization chamber thereby increasing the travel time and residence time of fuel in the chamber for complete vaporization. According to a preferred form the invention contemplates a variable control fuel inlet nozzle means at the inlet end of the chamber for variably restricting the flow of fuel into the chamber, fragmenting and misting the liquid fuel, and delivering the fuel in directions off axis from the longitudinal axis of the vaporization chamber. The novel variable control fuel inlet nozzle arrangement comprises a right angle entry into the vaporization chamber inlet end, a nozzle seating surface fixed to the inlet end of the chamber, and a mating nozzle tip having a control arm extending outside the right angle entry of the nozzle arrangement for either automatic or manual control of the flow of fuel through the nozzle. For automatic control, the control arm passes through and engages the outer wall of the right angle entry with a steep pitch thread so that the entire range of fuel flow settings is covered by turning the control arm in the range of 90° F. or 180° F. The control arm terminates in a knob with an eccentrically mounted reciprocating lever arm operated by a servo motor in response to the RPM of the engine or other parameter of the engine correlated with fuel flow rate. Remote manual control can also be provided from the driver's seat.

According to yet a further aspect of the invention, the elongate electrically heated vaporization chamber interposed in the fuel line upstream from the carburetor or intake manifold of an internal combustion engine is activated electrically by first stage electrical circuit wires comprising electrical power supply lead wires suitable for coupling to the electrical power supply associated with the internal combustion engine, and second stage electrical circuit wires comprising high temperature durable lead wires coupled to the first stage power supply lead wires. A junction box encloses the couplings of the power supply lead wires to the high temperature lead wires. Finally, the high temperature durable resistance wire heating coil wrapped in spaced helical turns around the elongate vaporization chamber comprises yet a third stage electrical wiring, the ends of said resistance wire heating coil coupled to the second stage high temperature lead wires by a high temperature durable coupling.

The vaporization chamber and also the high temperature durable couplings between the second and third stages of the electrical circuitry are enclosed within a housing separate from the junction box and the housing enclosure and junction box are mounted in spaced apart relationship with each other. Refractory sheathing extending between the vaporization chamber housing and the junction box sheaths the high temperature lead wires extending from the chamber housing to the junction box. A feature and advantage of this arrangement is that high temperature portions of the electrical circuitry are limited to the housing enclosure and materials and couplings capable of enduring high temperatures. That is, the junction between the first and second stages is thermally isolated from the junction between the second and third stages with the overall effect that the conventional electrical power supply wiring is thermally isolated from the high temperature of the heating coil. Dissipation of heat from the high temperature at the housing is facilitated and thermal conductivity between the high and low temperature portions of the electrical circuit is minimized.

Other objects, features and advantages of the present invention will become apparent in the following specification and accompanying drawings.

PRIOR ART STATEMENT

There is a long history and variety of arrangements of devices attempting vaporization of gasoline fuel prior to combustion in internal combustion engine. A number of prior art references describe the use of both hot exhaust gas and electrical heating elements as the source of heat for vaporization of the fuel. Thus, U.S. Pat. Nos. 1,361,503; 1,825,830; 3,633,553; 4,103,658; and 4,126,111 all disclose the combination of passing the fuel in heat exchange relationship with the exhaust, and electrical resistance wire heating. In these patents, the use of electrical heating is generally included only for start up. However, we have found that the engine exhaust as a source of heat for vaporization is inadequate and erratic and that electrical heating is required to effect the full and complete vaporization of the complex of compounds constituting gasoline. Furthermore to the extent these references teach the use of resistance wire heating, merely conventional heating elements are described. There is no teaching of how to design and match the heating capacity of the heating elements with the complex thermodynamics of handling and changing state of gasoline, particularly under safe conditions. Probably the most pertinent reference known to the inventors is the Brown U.S. Pat. No. 3,907,946, but this reference discloses and required the use of complex electronic monitoring and control of temperature. Moreover, none of the references teaches the use of matching materials, staged couplings, and self regulation according to the inventive concept herein disclosed and claimed. Nor are these prior art devices suited for easy retrofitting upstream from the conventional carburetor of conventional internal combustion engines as contemplated and achieved by the present invention. Nor do these patents specify any operating temperature or temperature ranges for optimum and safe operation, or means for safely achieving such operating temperatures or temperature ranges and profiles.

DESCRIPTION OF THE PREFERRED EMBODIMENT

Figures 1, 1A, 3A:
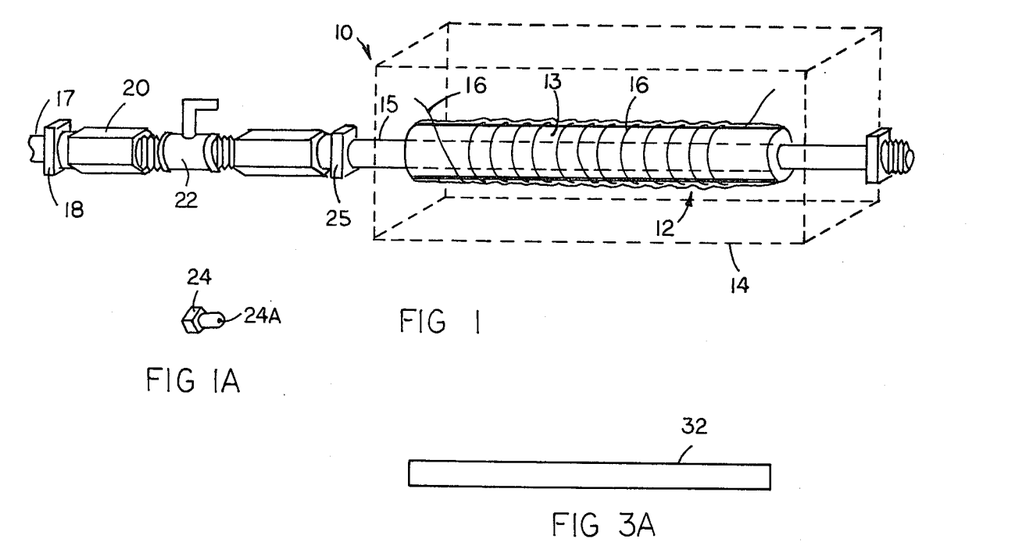
FIG. 1 is a side perspective view of a gasoline fuel vaporization and delivery system according to the present invention suitable for placement in the fuel line upstream from the carburetor of an internal combustion engine.
FIG. 1A is a detail view of the fuel inlet aperture of the vaporization chamber shown in FIG. 1.
FIGS. 3A-3D represent side elevation views of steps in the preparation of the vaporization chamber according to the present invention.

In the embodiment of the present invention illustrated in FIG. 1 there is shown a primary fuel vaporizing system 10 including the vaporizing chamber 12 within a chamber housing enclosure 14 shown in phantom outline. The fuel vaporization chamber consists of a length of copper tubing 15 or tubing of other metal used in automobile fuel lines having an inner diameter of 5/16 or ⅜ inches according to the engine and car model. The metal tubing may be in the order of 10 inches long and includes a 6" to 7" portion covered with electrically insulating material 13 such as porcelain or muffler putty. Around the electrically insulating material is wound a heating coil of high temperature durable resistance wire capable of withstanding temperatures of over 1200° F. such as nickel-chromium wire or other thermocouple wire such as Alumel alloy wire capable of withstanding much higher temperatures over longer periods of time.

The inlet side or upstream side of the vaporization chamber is coupled to the fuel line 17 of the engine by means of a conventional flare screw 18 and mating coupling 20. A manually operated fuel flow regulator 22 is set to the requirements of engine size and fuel flow requirements of the particular application. The fuel regulator valve is also connected in the line by mating flare couplings. Just upstream from the entrance to the vaporization chamber 12 is a precision fuel inlet aperture 24 shown in detail in FIG. 1A having an opening 24A of for example 0.03125 inches. This restricting orifice fragments and spray mists the liquid gasoline fuel as it enters the vaporization chamber for more efficient capture of heat and vaporizing. The outlet end of the chamber is coupled through flare screw coupling 25 to the fuel line leading into the airstream in the throat of the carburetor or into an airstream leading to the intake manifold.

In this respect, the traditional carburetor is merely used as a conduit for introducing the vaporized gasoline fuel into an air stream leading into the intake manifold and the reservoir and float mechanisms of the carburetor are no longer needed. In any event the outlet from the vaporization chamber is coupled into the fuel line by means of flare coupling 25 just upstream from the carburetor so that it enters the carburetor at the same place as the gasoline during conventional liquid fuel operation. To afford greater volume flow of fuel vapor the air vent of the carburetor is also used to introduce fuel vapor by punching a hole in the inlet gasket so that vapor also feeds through air vent. The primary fuel vaporizing system is placed as close to the carburetor as possible to minimize the length of the line traversed by the fuel in the vapor state thereby minimizing recondensation. Spacing in the range of 2" to one foot have been found operative, preferably in the shorter range. Further to eliminate recondensation the length of fuel line leading from the vaporization chamber outlet to the carburetor may be wrapped with thermally insulating material or reflecting metal foil or both. Further to reduce condensation, the gas filter is removed from the carburetor.

The primary fuel vaporizing system of FIG. 1 was tested successfully from June 3, 1979 to June 14, 1979 on a 330 cubic inch V-8 engine in a 1965 Oldsmobile F-85, improving the mileage from a previous 14 miles per gallon to 27.5 miles per gallon. In the example of FIG. 1, a 16 inch length of Nichrome alloy wire was used affording an output capacity of approximately 4.8 watts for heating the vaporization chamber to a dry temperature of 600° F. Since this arrangement was found operative but unable to supply the fuel vapor requirements at faster rates, the arrangement of FIG. 2 was devised affording greater heat output.

Figure 2:
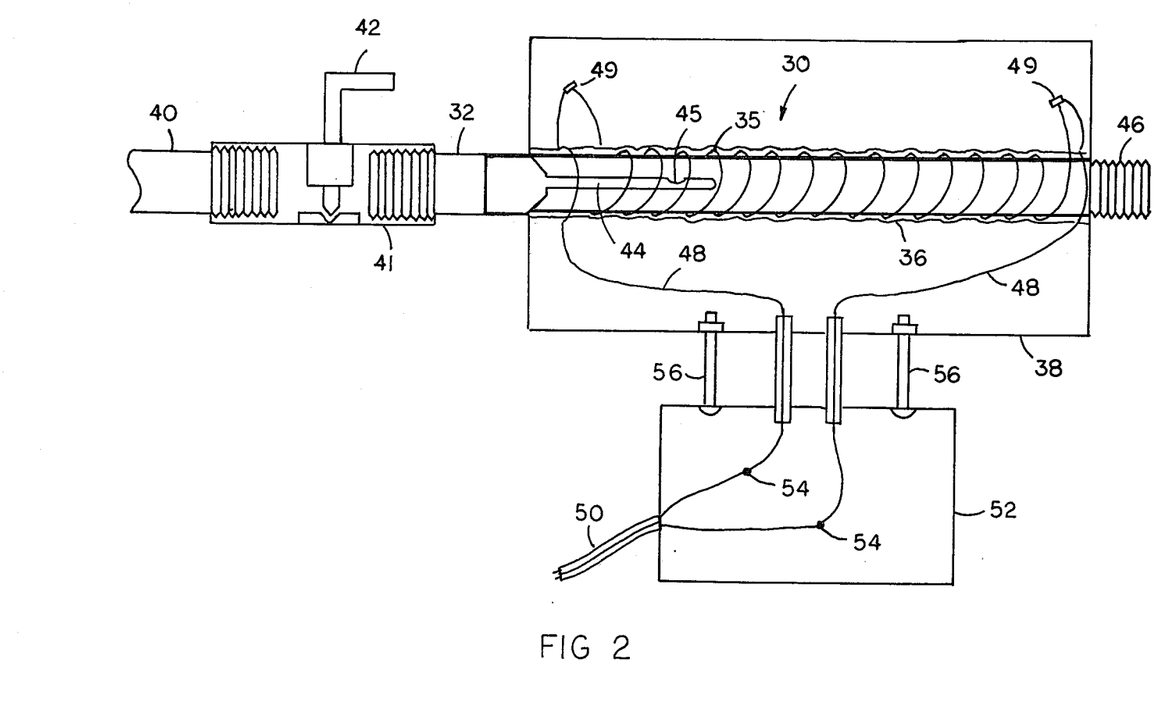
FIG. 2 is a side view in partial cross section of another gasoline fuel vaporization system according to the present invention with a different entrance orifice for the vaporization chamber and showing the staged, thermally isolating, electrical coupling between the electrical power supply and the resistance wire heating coil.
Figure 3B:
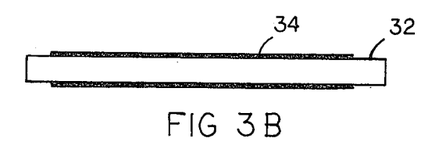
Figure 3C:
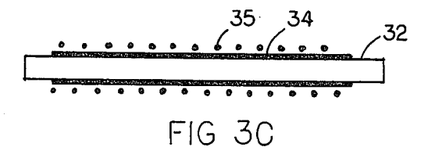
Figure 3D:
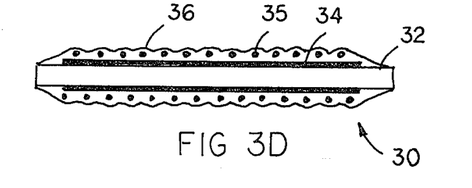

In the example of FIG. 2, the primary fuel vaporization chamber 30 is prepared in accordance with the sequence of steps illustrated in FIGS. 3A-3D. At the core of the vaporizing chamber is a tube 32 of metal material such as copper tubing of inner diameter ⅜ inch to match the size of the fuel line in the car into which it will be retrofitted. This size will vary according to the application as hereafter further described. This inner copper tubing is then coated with a 1/16th inch layer 34 of high temperature, thermally conducting, electrically insulating porcelain cement as shown in FIG. 3B. Because it is thermally conducting it transfers the heat generated by the surrounding heating coil but insolates the coil electrically from the copper tubing. While the overall tube length is approximately 10 inches, the center 7 inches is coated with the procelain cement. One thirty second of an inch diameter Alumel alloy high temperature wire 35 about 16" in length is then wrapped in a coil of spaced helical turns around the portion of the tubing coated with electrically insulating porcelain providing a heating coil length of about 6 inches, as illustrated in FIG. 3C. Finally the heating coil of high temperature wire and the chamber were coated with a second layer of porcelain cement approximately ⅛ inch thick, in effect "potting" the coil around the chamber.

Referring again to FIG. 2, the copper tubing forming the inner core of the vaporization chamber and extending beyond the chamber and chamber housing enclosure 38 is coupled to the fuel line by threaded fittings and in particular a threaded sleeve 41 in which is included a manually operated fuel flow rate valve 42. The valve is manually set for the particular application in order not to overload the fuel vaporization system and carburetor and to match the liquid fuel flow rate range with the requirements of the engine. An important feature at the inlet end of the vaporization chamber where fuel is received from the line is restricted orifice gasoline injection needle 44 including a restricted outlet orifice 45 which sprays the gas into the chamber in a direction off axis from the longitudinal axis of the chamber, fragmenting the gasoline as it enters. This arrangement increases exposure of the liquid fuel to heat for vaporization and increases the residence time of the fuel in the chamber. The outlet end of the chamber includes threaded fitting 46 for coupling to the fuel line leading into the carburetor.

In this case as in the previous example, the carburetor is modified to permit passage of the larger volume of vapor required to equal the smaller volume of liquid and to convert the fluid feed carburetor to a vapor feed carburetor. This is accomplished as described above by using the air vent to bring vapor into the carburetor in addition to the fluid squirt holes by punching a hole in the horizontal gasket at the carburetor inlet, and also removing the gas filter from the carburetor, which filter impedes flow and may tend to condense vapor. The traditional carburetor is actually therefore not required and could be replaced with a simplified carburetor type component to provide an air stream for combination with the vapor stream as it enters the intake manifold.

Referring to the electrical coupling and circuitry for the primary fuel vaporizing system of FIG. 2, high temperature durable Alumel thermocouple type lead wire 48 of lower electrical resistance than the heating coil resistance wire 35 is joined to the ends of the heating coil inside the vaporization chamber containment box or housing enclosure 38 by high temperature durable couplings 49. This intermediate lead wire is then brought out of the enclosure for coupling to the power supply conventional lead wire 50 at a location outside the chamber housing 38 and in fact thermally isolated in junction box 52. Thus, the couplings 54 between the first stage power supply lead wire 50 and the high temperature lead wire 48 are isolated in junction box 52 which is mounted spaced apart from chamber enclosure 38 by support bolts 56. Intermediate lead wire 48 extends between the boxes appropriately insulated.

Figure 4A:
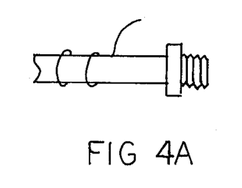
FIGS. 4A-4C are side elevations showing different forms of coupling for coupling the vaporization chamber and system into the fuel line of an internal combustion engine: flare coupling, threaded coupling and compression coupling respectively.
Figure 4B:
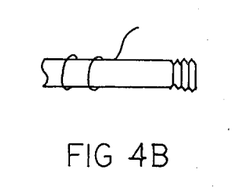
Figure 4C:
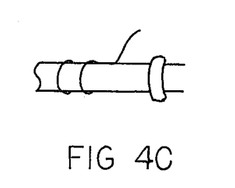

The gasoline fuel vaporization chamber and tubular core upon which it is fabricated may be coupled into the fuel line of an internal combustion engine according to a variety of couplings or fittings well known. For example, FIGS. 4A, 4B and 4C illustrate threaded flare couplings, threaded couplings, and compression ring couplings respectively. Moreover, the diameter of the chamber may be greater than the diameter of the fuel line so that conventional step up or step down adapters are used as is well known in the art of couplings. Such adapters are available for each of the types of fitting illustrated above.

In both the examples of FIGS. 1 and 2 the vaporization chamber housing enclosure 14 and 38 respectively is preferably filled with an insulating material such as fiberglas, filling the space around the vaporization chamber and between the chamber and the wall of the housing. Such insulation further enhances efficient heating within the chamber for vaporization of gasoline.

Figures 5, 5A:
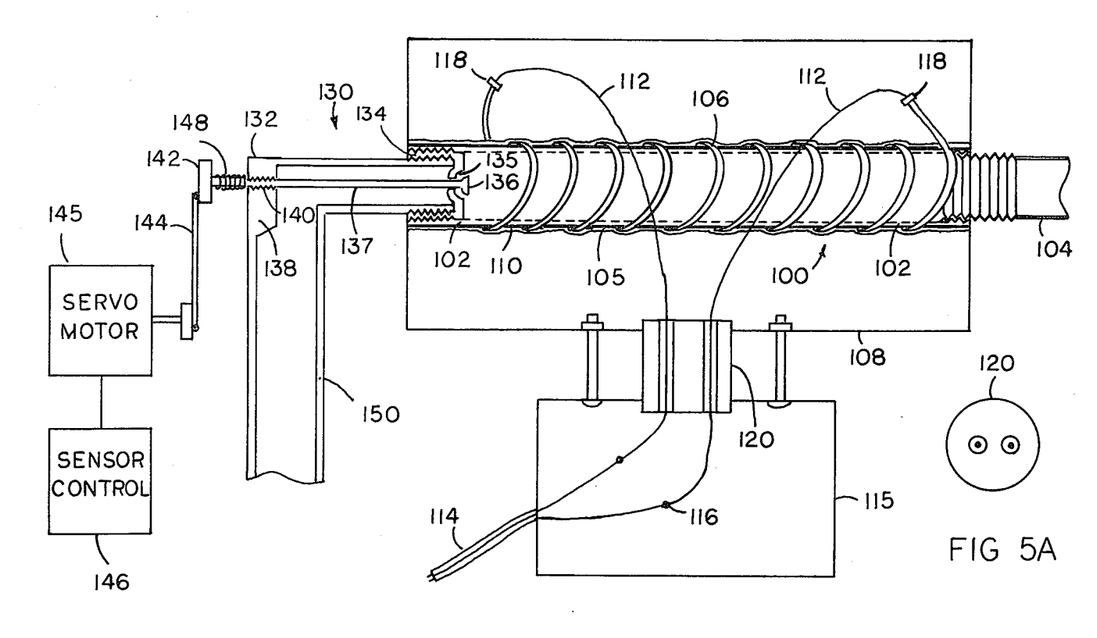
FIG. 5 is a side cross section of another gasoline fuel vaporization system according to the present invention showing the novel variable control nozzle fuel inlet for the vaporization chamber.
FIG. 5A is a cross section of the refractory sheathing.
Figure 6:
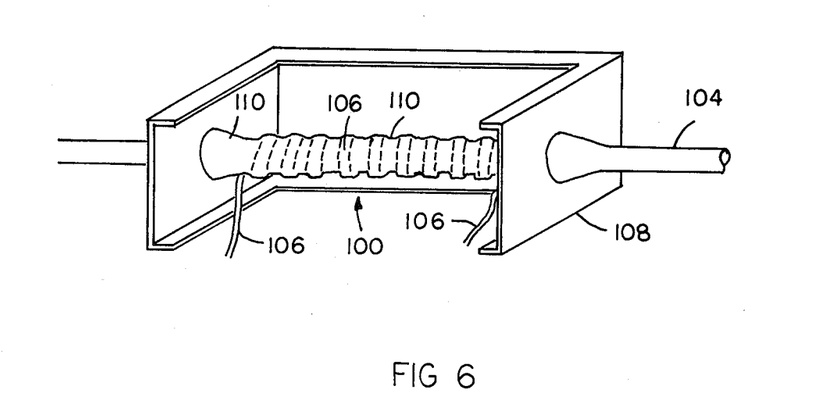
FIGS. 6 and 6A are a plan view of the finished device with and without the cover of the vaporization chamber housing enclosure removed.
Figure 6A:
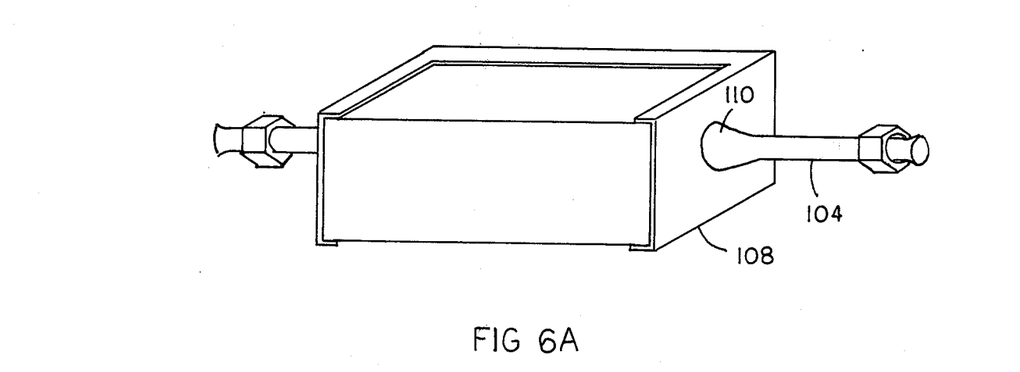

The preferred embodiment of the gasoline fuel vaporization and delivery system is illustrated in FIGS. 5 and 6. In this preferred arrangement the configuration of components and material parameters are carefully selected to provide a self regulating temperature control over the temperature profile generated in the vaporizing chamber when coupled to the 12 volt electrical system of the internal combustion engine. The vaporizing chamber 100 is formed by an inner core of copper tubing 102 with a slightly larger diameter than the fuel line into which it is coupled. As a result, step up or step down adapters are fitted to each end of the copper tubing and fittings such as flare fittings, compression fittings, or threaded fittings are used to connect the chamber tubing 102 to the fuel line of lesser diameter such as 104 at the output. Thus, the inner diameter of the chamber may be ½" while the fuel line is typically 5/16" or ⅜".

Around the chamber tubing 102 is coated a high temperature porcelain like cement capable of withstanding 2000° F. Two coats of such material are applied to electrically insulate the outer surface of the copper chamber and these coatings are dried and baked at a lower temperature of 175° F. A high temperature porcelain like cement suitable for this application is Omega CC high temperature cement, obtainable from Omega Engineering, Inc., Stamford, Connecticut 06907.

Around the coating 105 is wound a heating coil of spaced helical turns, with the wire formed in the configuration of a flat ribbon to rest against the procelain coating with greater thermal contact than is achieved by a round wire. The alloy selected for this wire is Kanthol D with a cross sectional width of 1/16" and a thickness of 0.0113 inch affording a resistance of approximately 0.8 ohms per foot. The overall length of the coil resistance wire 106 is selected in the range of 15 to 18 inches and preferably 16 inches thereby affording a heating coil resistance of approximately 1 ohm. With the conventional 12 volt source of an internal combustion engine driving the heating coil and therefore yielding a power dissipation in the wire approaching approximately 144 watts, it has been found that the maximum temperature reached by the coil and maximum dry temperature inside the chamber is approximately 800° F. Furthermore, with an average flow rate of several ounces per minute required by the average internal combustion engine at 3–10 psi pressure above atmospheric an optimum temperature profile from the inlet to outlet end of the chamber of 450° F. to 600° F. is maintained. Kanthol "D" thermocouple metal alloy wire can be obtained from the Kanthol Corporation, Wooster Street, Bethel, Connecticut 06801.

With the malleable heating coil resistance wire 107 tightly wound and held in place, as for example by folding the end of the wire over the edge of open housing enclosure box 108, the vaporization chamber is then finally coated or "potted" with up to ¼" thickness of a high temperature refractory furnace cement capable of withstanding temperatures of over 2000° F., this final coating enclosing the vaporization chamber is baked at for example 200° F. for 2–3 hours. While this outer coating of refractory cement is electrically insulating, it differs from the inner coating of porcelain beneath the coil because of its lower thermal conductivity tending to focus heat output inside the chamber.

For the dimensions described for the vaporization chamber illustrated in FIGS. 5 and 6 the coil length is approximately 6 inches with 10 turns of heating coil resistance wire 106 spaced along the tubular chamber. The last 4 turns or so are spaced closer together to concentrate heat in the output end, vaporizing any gasoline fuel still in the liquid state. This winding configuration enhances the temperature profile described above. Because of the greater heat of vaporization required in the front end of the chamber a lower steady state temperature of approximately 450° F. is reached at the inlet with 12 volt power, while the chamber at the outlet end reaches 600° F. during operation.

The conventional automobile and internal combustion engine fuel line pressure of 3–10 PSI above atmospheric is reached in in the chamber when the fuel pump is operating. The temperature and pressure conditions in the chamber are therefore well below the flash point of gasoline which is about 1000° F. at atmospheric, 1500° F. at 28 PSI, and 2000° F. at 40 PSI. While the safety margin below flash point is ample, the thermodynamic conditions and temperature profile in the chamber are also well above the 390° F. temperature at which all the gasoline fractions vaporize. With the parameters of the wire selected for the 12 volt system as described above, the maximum dry wire temperature attained is 800° F.

In order to provide electricity to the heating coil resistance wire 106, lead wires capable of handling 12 amps but also withstanding the high temperatures in the vaporization chamber are required. In order to accomplish this, 0.032 inch diameter Alumel alloy thermocouple wire capable of operating at temperatures up to 2300° F. is used for the lead wires. While the lead wire itself is a thermocouple wire it has relatively low resistance of approximately 0.29 ohms per foot in comparison with the higher resistance of 18 ohms per foot in the heating coil. While significantly lower in resistance, the Alumel resistance lead wires 112 are durable at high temperatures.

The high temperature durable lead wires 112 in effect provide an intermediate electrical circuit coupling between the conventional copper power supply lead wire 114 and the heating coil wire 106. The power supply lead wire 114 cannot withstand the high temperature conditions and changes in the vaporization chamber and so are coupled to the intermediate stage lead wires 112 in a separate junction box 115. This coupling 116, between the power supply lead wire 114 amounting to a first stage of electrical circuitry and the second stage high temperature durable lead wire 112, is isolated in junction box 115 from the heat of the vaporization chamber in housing enclosure 108 and so these couplings 116 may be of conventional type including soldering.

On the other hand the coupling 118 between the second stage lead wire 112 and the higher resistance heating coil 106 amounting to a third stage electrical circuit is enclosed within the housing enclosure 108 and must withstand the high temperatures reached in that housing by the vaporization chamber. As a result the coupling is made by mechanically crimping with a high pound test of, for example 1500 pounds.

As a result, electrical heating of the vaporization chamber 100 is effected by a three stage electrical coupling including the first stage power supply lead wire 114, the second stage high temperature durable lead wire 112, and the heat coil resistance wire 106. The coupling between the first and second stages is isolated in junction box 115 from the coupling between the second and third stages inside the vaporization chamber housing enclosure 108. The second stage lead wire 112 extends between the two housing boxes through a refractory sheathing 120. The insulating sheathing 120 is formed with two separate passageways for the two lead wires 112.

As previously described with respect to the examples of FIGS. 1 and 2, the chamber housing enclosure is filled with fiberglass insulation to cut down on heat loss and heat conductivity from the vaporization chamber and heating coil.

According to another novel feature of the gasoline fuel vaporization and delivery system illustrated in FIG. 5, liquid gasoline is introduced into the chamber from the fuel line through a variable control restricting orifice nozzle device 130 which includes a right angle entry 132 into the inlet and of chamber 100. According to the example shown, the step up adapter 134 between the right angle entry line 132 and core tubing 102 of the chamber is formed with a nozzle seating surface 135 fixed across the inlet opening of the chamber and a mating nozzle tip 136 with control arm 137 extending through the back wall 138 of the right angle entry into the chamber. This right angle entry thereby permits control over the nozzle by the extending arm which penetrates through the back wall. The control arm 137 engages the back wall 138 by a steep pitch thread 140. It should be noted that the rear wall 138 of the nozzle device is thickened to accommodate the threaded engagement.

Control arm 137 for the nozzle is fitted with an outer knob 142 for manual or automated turning to extend and retract the nozzle tip 136 and adjust the flow rate of the fuel over the range of desired operation of the engine. For automatic operation, an eccentrically mounted lever arm or drive arm is actuated by servo motor 145 in response to a signal from a transducer 146 which may, for example, provide a signal in proportion to the RPM of the engine or other engine parameter correlated with the fuel flow rate. Remote signal control can also be provided from the drivers seat. For such automatic control, the control arm 137 passes through the outer wall 138 and engages the wall in a steep pitch 140 so that the entire range of fuel flow settings is covered by turning the control arm in the range of 90° to 180°. Tension spring 148 maintains the control arm in position under tension between position shanges.

The lower portion 150 of the right angle entry leads through couplings or fittings to the fuel line and fuel pump of the internal combustion engine.

The electrical wiring system for the gasoline fuel vaporization system is fused through the fuse box and can also be provided with various sensors and indicators if desired showing the state of the system at the dashboard. However, by reason of the features and advantages of the present invention such sensors and indicators are not necessary because the system is self regulating in temperature attained in the vaporization chamber.

Models of the preferred embodiment of the present invention have been tested in a number of environments. In the first test, over 4,500 miles usage of the fuel vaporization system in a 1965 Model F-85 Oldsmobile using leaded gas, the mileage of this automobile with 330 cubic inch V-8 engine increased from 15 miles per gallon to 23 miles per gallon.

In a second test of usage in a 1977 Monte Carlo using unleaded gas in a 305 cubic inch engine, the installed primary vaporization system increased mileage from 16 miles per gallon to 22.7 miles per gallon.

In a third test by the Maine State Police the fuel vaporizer according to the present invention was installed in a 1977 Plymouth with a 428 cubic inch 4 barrel interceptor engine using unleaded gas and with catalytic converter. There was a 33% increase in gasoline mileage over a 600-mile course. This latter test was monitored to provide a computerized gas record.

While the invention has been described with reference to its use and novel application for vapor carburetion of gasoline fuel in an internal combustion engine, particularly for vehicles with conventional carburetors, the invention may also be applied and incorporated in a variety of applications where vaporization of a liquid fuel prior to combustion would be useful and efficient. Such applications may include, for example, home heating, cook stoves, carburetion generally, and other kinds of vehicle engines burning liquid fuel such as fuel injection engines and diesels.

We claim:

1. A new and improved gasoline fuel vaporization and delivery system for vaporization of gasoline from the fuel line of an internal combustion engine and for delivery of fuel in the vapor state to a conventional carburetor or into an airstream at the intake manifold of the internal combustion engine, said engine having an associated electrical power supply comprising:

an elongate vaporization chamber comprised of a tubular length of metal covered with a high temperature resistant, high thermal conductivity electrically insulating material, a heating coil of resistance wire wrapped in a helix around the electrically insulating material, and a coating of high temperature refractory material coated over the heating coil and chamber, said vaporization chamber formed with an inlet end for receiving liquid gasoline guel from the fuel line of the engine and an outlet end for delivering vaporized fuel;

said resistance wire heating coil comprised of a high temperature durable alloy having a resistance per unit length and overall length selected to generate heat at a temperature above the vaporization temperature of the gasoline fuel fractions or constituents but below the flash point temperature of such fuel constituents, when said coil is coupled to the electrical power supply voltage for the internal combustion engine, whereby the resistance wire heating coil at the applicable voltage of the power supply is self limiting in temperature output attained in the vaporization chamber to a level at a safe margin below the flash point of gasoline fractions;

high temperature durable lead wires coupled to the ends of the heating coil, said high temperature lead wires having a lower electrical resistance than the heating coil resistance wire, the couplings between the ends of the heating coil and the high temperature lead wires also being of the type durable at high temperature;

a housing enclosing the vaporization chamber and also enclosing the couplings of high temperature durable lead wires to the ends of the heating coil;

the ends of the high temperature lead wires opposite the couplings located outside the vaporization chamber housing enclosure for coupling to power supply lead wire; and valve means to control the flow of gasoline fuel into the chamber including a restricted delivery orifice at the inlet end to fragment the liquid fuel as it enters the chamber and thereby facilitate vaporization, said restricted delivery orifice oriented to deliver fuel in a direction off axis from the elongate axis of the vaporization chamber thereby increasing the travel time of fuel in the chamber for complete vaporization.

2. A gasoline fuel vaporization system as set forth in claim 1 wherein is provided at the inlet end of the vaporization chamber a variable control fuel inlet nozzle means for variably restricting the flow of fuel into the chamber, fragmenting and misting the liquid fuel, and delivering the fuel in directions off-axis from the elongate axis of the vaporization chamber.

3. A gasoline fuel vaporization system as set forth in claim 2 wherein said variable control fuel inlet nozzle means comprises a right angle entry into the vaporization chamber inlet end, a nozzle seating surface fixed to the inlet end of the chamber, and a mating nozzle tip having a control arm extending outside the right angle entry of the nozzle means for either automatic or manual control of the flow of fuel through the nozzle.

4. A gasoline fuel vaporization system as set forth in claim 1 wherein the resistance wire for the heating coil is selected for a resistance per unit length and overall length to generate heat at a temperature in the vaporization chamber of at least approximately 390° F. and no greater than approximately 800° F., even when the vaporization chamber is dry.

5. A gasoline fuel vaporization system as set forth in claim 4 wherein the resistance wire parameters are selected to yield a temperature profile in the vaporization chamber from the inlet end to the outlet end in the preferable range of 450° F. to 600° F., at the applicable flow rate and pressure of gasoline for the internal combustion engine.

6. A fuel vaporization system as set forth in claim 5 wherein the helical turns of the heating coil are spaced closer together at the outlet end of the vaporization chamber concentrating heat delivery at the outlet end for vaporization of any fuel still in the liquid state.

7. A gasoline fuel vaporization system as set forth in claim 1 wherein said resistance wire heating coil is adapted for use with 12 volt electrical power supplies and wherein the wire is formed with a resistance per unit length and overall length to cover the chamber with spaced helical turns and afford overall resistance of approximately one ohm.

8. A gasoline fuel vaporization system as set forth in claim 7 wherein said heating coil resistance wire is formed in a flat ribbon wire configuration to facilitate winding in spaced helical turns over the tubular chamber and to enhance heat delivery to the chamber.

9. A gasoline fuel vaporization system as set forth in claim 8 said heating coil resistance wire has a resistance in the vicinity of 0.8 ohms per foot and a length in the range of 15 to 18 inches.

10. A fuel vaporization system as set forth in claim 9 wherein said heating coil resistance wire comprises a high temperature durable alloy dimensioned to afford approximately 0.8 ohms per foot with an overall length of approximately 16 inches, and said vaporization chamber is approximately 6 inches long with an inner diameter in the range of 5/16 to ¼ inch.

11. A fuel vaporization system as set forth in claim 8 wherein said resistance wire is in the configuration of flat ribbon were comprised of "Kanthol D" alloy dimensioned to approximately 1/16 inch in width and 0.0113 inches in thickness.

12. A fuel vaporization system as set forth in claim 1 wherein the high temperature resistant high thermal conductivity material covering the tubular length of metal for the vaporization chamber comprises at least one coat of porcelain-like cement whereas the outer coating over the heating coil and chamber comprises a refractory cement of lower thermal conductivity for concentrating heat in the vaporization chamber.

13. A fuel vaporization system as set forth in claim 1 wherein the tubular length of the vaporization chamber is of the same inner diameter as the fuel line for the internal combustion engine or of larger inner diameter than the fuel line.

14. A fuel vaporization system as set forth in claim 13 wherein the inner diameter of the vaporization chamber is approximately in the range of 5/16 to ½ inch.

15. A fuel vaporization system as set forth in claim 1 wherein is also provided power supply lead wires coupled to the high temperature lead wires at a location outside the vaporization chamber housing enclosure and wherein is also provided junction box means enclosing the couplings of the power supply lead wires and the high temperature lead wires, said junction box mounted in spaced apart relationship with the vaporization chamber housing enclosure.

16. A fuel vaporization system as set forth in claim 15 wherein is provided a refractory sheathing extending between the vaporization chamber housing and the junction box for enclosing the high temperature lead wire extending from the heating coil in the chamber housing to the power supply lead wire in the junction box.

17. In a gasoline fuel vaporization and delivery system for internal combustion engines including an elongate vaporization chamber interposed in the fuel line upstream from the carburetor or intake manifold of the internal combustion engine, said engine including an associated electrical power supply, the improvement comprising:
    said vaporization chamber formed with a heating coil of resistance wire comprised of a high temperature durable alloy and having a resistance per unit length and an overall length selected to generate heat at a temperature in the chamber above the vaporization temperature of the gasoline fuel fractions or constituents but below the flash point temperature of such constituents when said coil is coupled to the electrical power supply voltage for the internal combustion engine, whereby the resistance wire heating coil is self limiting in temperature output attained at the applicable voltage of the power supply to a level at a safe margin below the flash point of the gasoline fractions, said heating coil comprising helical turns spaced closer together at the outlet end of the vaporization chamber concentrating heat delivery at the outlet end for vaporization of any fuel still in the liquid state.

18. A gasoline fuel vaporization system as set forth in claim 17 wherein the resistance wire for the heating coil is selected for a resistance per unit length and overall length to generate heat at a temperature in the vaporization chamber of at least approximately 390° F. and no greater than approximately 800° F., even when the vaporization chamber is dry.

19. A fuel vaporization system as set forth in claim 18 wherein the resistance wire parameters are selected to yield a temperature profile in the vaporization chamber from the inlet end to the outlet end in the preferable range of 450° to 600°, at the applicable flow rate and pressure of gasoline for the internal combustion engine.

20. A gasoline fuel vaporization system as set forth in claim 17 wherein said resistance wire heating coil is adapted for use with 12 volt electrical power supplies and wherein the wire is formed with a resistance per unit length and overall length to cover the chamber with spaced helical turns and afford overall resistance of approximately one ohm.

21. A gasoline fuel vaporization system as set forth in claim 20 wherein said heating coil resistance wire is formed in a flat ribbon wire configuration to facilitate winding in spaced helical turns over the tubular chamber and to enhance heat delivery to the chamber.

22. A gasoline fuel vaporization system as set forth in claim 21 said heating coil resistance wire has a resistance in the vicinity of 0.8 ohms per foot and a length in the range of 15 to 18 inches.

23. A fuel vaporization system as set forth in claim 22 wherein said heating coil resistance wire comprises a high temperature durable alloy dimensioned to afford approximately 0.8 ohms per foot with an overall length of approximately 16 inches, and said vaporization chamber is approximately 6 inches long with an inner diameter in the range of 5/16 to ½ inch.

24. A fuel vaporization system as set forth in claim 21 wherein said resistance wire is in the configuration of flat ribbon wire comprised of "Kanthol D" alloy dimensioned to approximately 1/16 inch in width and 0.0113 inches in thickness.

25. In a gasoline fuel vaporization and delivery system of internal combustion engines including an elongate electrically heated vaporization chamber interposed in the fuel line upstream from the carburetor or intake manifold of the internal combustion engine, said engine including an associated electrical power supply, the improvement comprising:
    first stage electrical circuit means comprising electrical power supply lead wires suitable for coupling to the electrical power supply;
    second stage electrical circuit means comprising high temperature durable lead wires coupled to the first stage power supply lead wires;
    junction box means enclosing the couplings of the power supply lead wires to the high temperature lead wires;
    and third stage electrical circuit means comprising high temperature durable resistance wire heating coil means wrapped in spaced helical turns around the elongate vaporization chamber for electrically heating the chamber, the ends of said resistance wire heating coil coupled to the second stage high temperature lead wires by a high temperature durable coupling;
    said high temperature durable lead wires having lower electrical resistance than the high temperature durable resistance wire heating coil;
    and a housing enclosing the vaporization chamber and also enclosing the couplings of high temperature durable lead wires with the ends of the heating coil, said vaporization chamber housing enclosure and junction box mounted in spaced apart relationship with each other for dissipation of heat generated at the vaporization chamber and for minimizing heat conductivity to the electrical power supply first stage lead wires and the coupling between the first and second stages.

26. A gasoline fuel vaporization system as set forth in claim 25 wherein said third stage heating coil resistance wire is a high temperature durable alloy selected to have a resistance per unit length and overall length to generate heat at a temperature in the chamber above the vaporization temperature of the gasoline fuel fractions or constituents but below the flash point temperature of such fuel constituents when the heating coil is powered by the electrical power supply voltage, whereby the resistance wire is self limiting in temperature output attained at the applicable voltage of the power supply to a level at a safe margin below the flash point of gasoline fractions, said chamber temperature being in the range of 360° F.–800° F. and preferably in the range of 450° F.–600° F.

27. A gasoline vaporization and delivery system as set forth in claim 25 wherein is provided refractory sheathing extending between the vaporization chamber housing and the junction box, said sheathing enclosing the high temperature lead wires extending from the chamber housing enclosure to the junction box.

28. A gasoline vaporization and delivery system as set forth in claim 25 wherein the coupling between the second and third stage electrical circuit means comprises crimping of the wires.

29. In a gasoline fuel vaporization system using a vaporization chamber having an inlet for receiving liquid fuel from the fuel line of an internal combustion engine and an outlet for delivering vaporized fuel to the carburetor or intake manifold, the improvement comprising:
variable control fuel inlet nozzle means for variably restricting the flow of fuel into the chamber, fragmenting and misting the liquid fuel, and delivering the fuel in directions off-axis from the longitudinal axis of the vaporization chamber, said variable control fuel inlet nozzle means comprising a right angle entry into the vaporization chamber inlet end, a nozzle seating surface fixed to the inlet end of the chamber, and a mating nozzle tip having a control arm extending outside the right angle entry of the nozzle means for either automatic or manual control of the flow of fuel through the nozzle, in an annular cone around the nozzle tip directed outwardly from longitudinal axis of the chamber.

30. A gasoline fuel vaporization system as set forth in claim 29 wherein the control arm of the variable control fuel inlet nozzle passes through the back wall of the right angle entry into the chamber, said control arm and back wall formed in threaded engagement with each other whereby rotation of the control arm advances and retracts the nozzle tip thereby varying the rate of flow and fragment size of the liquid fuel as it passes around the nozzle tip at outwardly directed angles.

31. A gasoline fuel vaporization system as set forth in claim 30 wherein is also provided servo motor means for rotating said control arm in response to engine RPM or other parameter correlated with the fuel flow rate of the engine.

32. In a gasoline fuel vaporization and delivery system for internal combustion engines including an elongate vaporization chamber interposed in the fuel line upstream from the carburetor or intake manifold of the internal combustion engine, said engine including an associated electrical power supply, the improvement comprising:
said vaporization chamber formed with a heating coil of resistance wire comprised of a high temperature durable alloy and having a resistance per unit length and an overall length selected to generate heat at a temperature in the chamber above the vaporization temperature of the gasoline fuel fractions or constituents but below the flash point temperature of such constituents when said coil is coupled to the electrical power supply voltage for the internal combustion engine, whereby the resistance wire heating coil is self limting in temperature output attained at the applicable voltage of the power supply to a level at a safe margin below the flash point of the gasoline fractions, said heating coil comprising resistance wire having parameters selected to yield a temperature profile in the vaporization chamber from the inlet end to the outlet end in the preferable range of 450° to 600°, at the applicable flow rate and pressure of gasoline for the internal combustion engine, said resistance wire heating coil adapted for use with 12 volt electrical power supplies and wherein the wire is formed with a resistance per unit length and overall length to cover the chamber with spaced helical turns and afford overall resistance in the vicinity of approximately about one ohm, said heating coil resistance wire formed in a flat ribbon wire configuration to facilitate winding in spaced helical turns over the tubular chamber and to enhance heat delivery to the chamber, said heating coil resistance wire comprising a high temperature durable alloy dimensioned to afford approximately 0.8 ohms per foot with an overall length of approximately 15 to 18 inches, said vaporization chamber being approximately 6 inches long with an inner diameter in the range of 5/16 to ½ inch.

33. A fuel vaporization system as set forth in claim 32 wherein said resistance wire is flat ribbon wire comprised of "Kanthol D" alloy dimensioned to approximately 1/16 inch in width and 0.0113 inches in thickness.

* * * * *